UNITED STATES PATENT OFFICE.

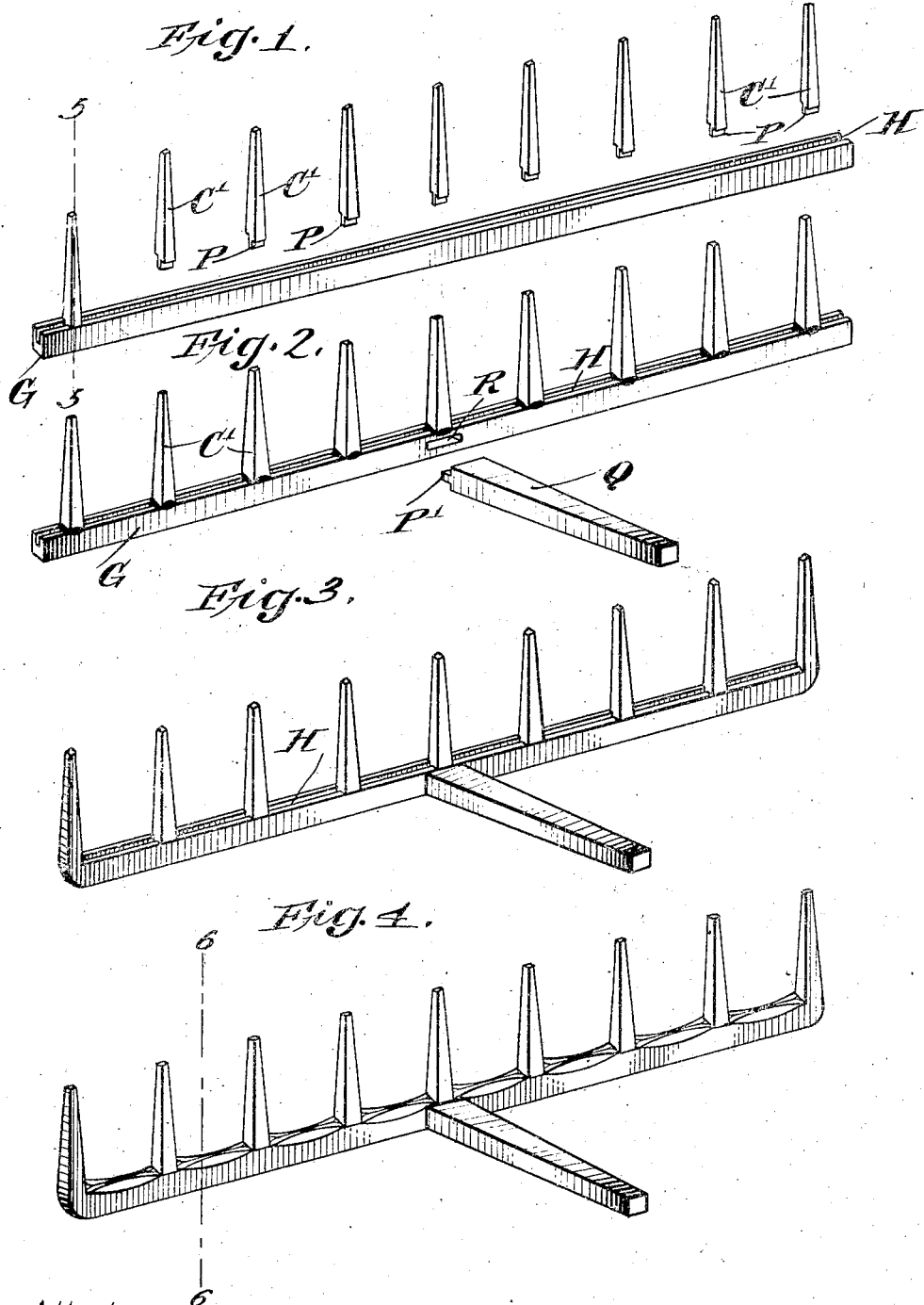

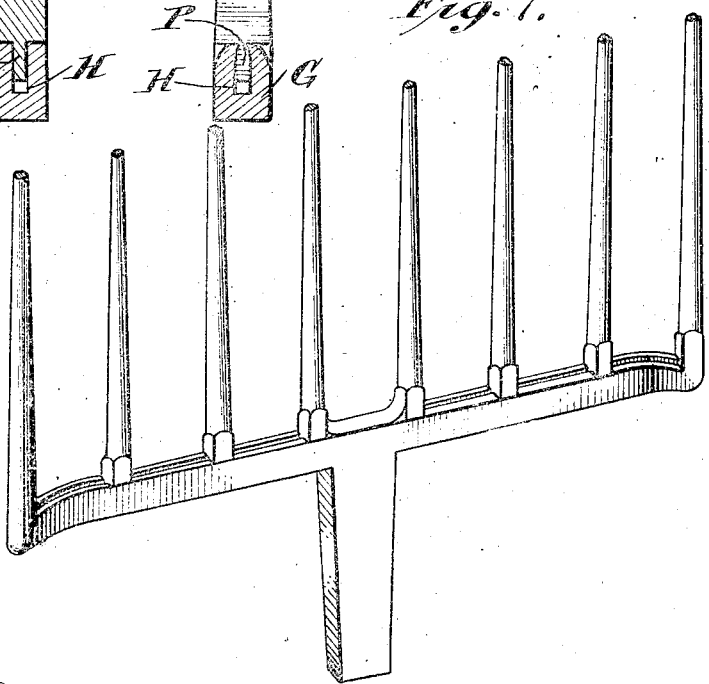

MAURICE LACHMAN, OF NEW YORK, N. Y., ASSIGNOR TO STANDARD PULLEY MANUFACTURING COMPANY, A CORPORATION OF NEW YORK.

PROCESS OF ELECTRIC WELDING.

1,063,357.  Specification of Letters Patent.  Patented June 3, 1913.

Application filed October 17, 1906, Serial No. 339,339. Renewed August 22, 1908. Serial No. 449,821.

*To all whom it may concern:*

Be it known that I, MAURICE LACHMAN, a citizen of the United States, and a resident of the borough of Manhattan, city, county, and State of New York, have invented certain new and useful Improvements in Processes of Electric Welding, of which the following is a specification, accompanied by drawings.

This invention relates to an improved process of electric welding, more particularly to the process of angle or T welding, although the process may be used in any connection in which it is applicable.

The objects of the invention are to improve upon processes of angle or T welding, to enable a more secure weld to be obtained, and avoid the formation of a large bur at the point of weld, the removal of which increases the expense of welding processes.

In the ordinary methods of making a T-weld, as between the end of a rod of metal and the flat side of another bar, the difference in the conductive cross-sectional area offered the welding current causes the end of the rod and the side of the bar to heat quite differently, the development of heat being inversely as the conductive cross-sectional area. The amount of current which will bring the end of the rod to a welding condition in a given time will not so heat the bar with which it contacts and the contact must be prolonged to procure a union. During this prolonged contact, the end of the rod burs out unduly under the welding pressure. Nor is a good weld generally attained, as the heat conductivity of the larger mass of metal prevents, or interferes with, the localized development of high temperature on its surface from the contact resistance with the end of the rod while its own lack of electrical resistance prevents its mass heating up. Unions attained in this manner are, therefore, apt to be superficial as far as the bar is concerned and tear apart readily, the burred end of the rod rather adhering than cohering to the flat of the bar and not becoming integral with its substance as should be the case in a true weld.

It is the object of the present invention to devise a cheap, simple and ready method of producing a firm, permanent and autogenous union in T and angle welding in which the end of a piece of metal is to be integrally united with a body of metal of larger area, and to accomplish this purpose, the body of metal of larger area is first so treated as to produce at the point of intended union a contacting surface of less area than that of the end of the piece of metal which is to be welded to it; all as is more specifically hereinafter described.

In the accompanying illustrations are shown, more or less diagrammatically, certain means and materials as used in the performance of my process. In this showing Figure 1 is a perspective view of the parts of a rake or tined article to be welded; Fig. 2 shows the parts illustrated in Fig. 1 welded together; Fig. 3 shows the handle welded to the back of the rake; Fig. 4 shows the completed rake after the grooves between the tines have been closed; Figs. 5 and 6 are enlarged sectional views of Figs. 3 and 4; Fig. 7 shows the application of the process to a hay fork or the like. Figs. 8 and 9 show a modified form of applicant's process, the back of the article being provided with pairs of transverse grooves.

It has heretofore been proposed to make the parts of rakes and forks by electrical butt welding, but prior methods have been open to the objection that an excessive bur has been formed at the points of weld as for instance between the back and the tines, which must be removed in the finishing process, which is expensive and troublesome.

In Fig. 1, the back G is constructed in the present instance with a longitudinal groove H, while the tines C' are provided with tongues P preferably of shorter length than the depth of the groove H to prevent their making contact with its base. These tongues P have for their object to enable the tines to be centered on the back and enable them to be welded evenly along the back.

In Fig. 2, the tines are shown welded to the back and the handle Q of the rake is shown adapted to be welded to the back. This handle is also preferably provided with a tongue P' adapted to enter a socket R in the back of the rake and center the handle in the process of welding.

Fig. 3 illustrates the rake with the tines and handle welded thereto, while in Fig. 4 the completed rake is shown, in which the edges of the groove H between the tines have been pressed together to substantially close the groove and prevent the entrance of foreign matter.

Fig. 7 illustrates the process shown in Figs. 1, 2, 3 and 4 applied to the manufacture of forks, as for instance, hay forks, which are ordinarily required to be large and strong.

In Figs. 8 and 9 a modification of the process is shown, in which the back 10 is provided with pairs of transverse grooves 12, while the tines 13 are provided with two projections 14, adapted to enter the grooves 12 and enable the tine to be centered or guided in the operation of welding. As shown, the tines are wide enough to project over the grooves at the points 15.

The object of all the constructions illustrated is to reduce the cross sectional area of the larger piece or back in such manner that a localized area of the back and the tine will be heated to substantially the same degree in the same time, thereby assuming substantially the same degree of plasticity, so that they may be pressed together and welded without the formation of a substantial bur at the point of weld.

The flow of current is interrupted as soon as an integral weld union has been formed between the abutting surfaces of the tine and the grooved base, and before the latter suffers any substantial deformation.

I claim and desire to obtain by Letters Patent the following:

1. The process substantially as herein described of forming an angle or T weld, which consists in providing one of the parts to be welded with a groove and the other part with a tongue of shorter length than the depth of the groove, placing the tongue in the groove, passing a current of electricity through said parts and simultaneously therewith forcing them together.

2. The process substantially as herein described of forming an angle or T weld, which consists in providing one part to be welded with a longitudinal groove along one side and providing the butt of the other part with a tongue of shorter length than the depth of the groove, placing the tongue in the groove, passing a current of electricity through said parts and simultaneously therewith forcing them together.

In testimony whereof I have signed this specification in the presence of two subscribing witnesses.

MAURICE LACHMAN.

Witnesses:
 OLIN A. FOSTER,
 A. K. SCHNEIDER.